(12) United States Patent
Matsuzaki et al.

(10) Patent No.: US 7,773,304 B2
(45) Date of Patent: Aug. 10, 2010

(54) OPTICAL PICKUP, OPTICAL DISC DRIVE DEVICE, AND OPTICAL INFORMATION DEVICE

(75) Inventors: Keiichi Matsuzaki, Osaka (JP); Yoshiaki Komma, Osaka (JP); Toshiyasu Tanaka, Osaka (JP); Kousei Sano, Osaka (JP); Kanji Wakabayashi, Kyoto (JP); Hidenori Wada, Kyoto (JP)

(73) Assignee: Panasonic Corporation, Osaka (JP)

( * ) Notice: Subject to any disclaimer, the term of this patent is extended or adjusted under 35 U.S.C. 154(b) by 142 days.

(21) Appl. No.: 12/280,601

(22) PCT Filed: Jan. 23, 2007

(86) PCT No.: PCT/JP2007/050982

§ 371 (c)(1),
(2), (4) Date: Aug. 25, 2008

(87) PCT Pub. No.: WO2007/097150

PCT Pub. Date: Aug. 30, 2007

(65) Prior Publication Data

US 2009/0086330 A1    Apr. 2, 2009

(30) Foreign Application Priority Data

Feb. 27, 2006  (JP) .............................. 2006-050178

(51) Int. Cl.
*G02B 17/00* (2006.01)
(52) U.S. Cl. ..................................................... 359/649
(58) Field of Classification Search ................. 359/648, 359/649, 650, 651
See application file for complete search history.

(56) References Cited

U.S. PATENT DOCUMENTS 7,027,378 B2 *  4/2006  Komma et al. ......... 369/112.01

(Continued)

FOREIGN PATENT DOCUMENTS

EP      1 615 212      1/2006

(Continued)

OTHER PUBLICATIONS

Supplementary European Search Report issued Mar. 2, 2009 in EP 07 70 7245, which is foreign counterpart to the present application.

(Continued)

*Primary Examiner*—Scott J Sugarman
(74) *Attorney, Agent, or Firm*—Wenderoth, Lind & Ponack, L.L.P.

(57) ABSTRACT

A small optical pickup of wide spherical aberration correction range includes a rising mirror for perpendicularly deflecting a light beam and guiding the light beam to an objective lens; a spherical aberration correction lens having one surface formed to a larger curvature than the other surface; a lens holder for holding the correction lens so that the surface of large curvature projects towards the rising mirror side; an axially extending guide member; and a slidable part slidable along the guide member. The projecting portion of the slidable part is configured to be fitted within the side surface of the reflecting surface of the rising mirror, and the projecting portion from the lens holder of the spherical aberration correction lens overlaps the reflecting surface of the rising mirror when the spherical aberration correction lens approaches the rising mirror the most.

12 Claims, 8 Drawing Sheets

U.S. PATENT DOCUMENTS

| | | |
|---|---|---|
| 2005/0105446 A1 | 5/2005 | Sakamoto et al. |
| 2005/0157608 A1 | 7/2005 | Nagatsuka |
| 2005/0232094 A1 | 10/2005 | Hoshino |
| 2006/0013109 A1 | 1/2006 | Fujiwara et al. |
| 2006/0028935 A1 | 2/2006 | Mori et al. |
| 2007/0177481 A1* | 8/2007 | Kimura et al. ......... 369/112.01 |

FOREIGN PATENT DOCUMENTS

| | | |
|---|---|---|
| EP | 1 764 787 | 3/2007 |
| JP | 10-003687 | 1/1998 |
| JP | 11-353692 | 12/1999 |
| JP | 2003-045068 | 2/2003 |
| JP | 2003-091847 | 3/2003 |
| JP | 2004-077705 | 3/2004 |
| JP | 2005-122778 | 5/2005 |
| JP | 2005-209267 | 8/2005 |
| JP | 2005-209325 | 8/2005 |
| JP | 2005-284169 | 10/2005 |
| JP | 2005-302118 | 10/2005 |
| JP | 2006-40411 | 2/2006 |
| WO | 2006/003997 | 1/2006 |
| WO | 2006/038483 | 4/2006 |
| WO | 2007/083809 | 7/2007 |

OTHER PUBLICATIONS

International Search Report issued Feb. 27, 2007 in the International (PCT) Application of which the present application is the U.S. National Stage.

International Preliminary Report on Patentability issued Sep. 2, 2008 in the International (PCT) Application of which the present application is the U.S. National Stage.

Written Opinion of the International Searching Authority issued Sep. 2, 2008 in the International (PCT) Application of which the present application is the U.S. National Stage.

* cited by examiner

OPTICAL PICKUP, OPTICAL DISC DRIVE DEVICE, AND OPTICAL INFORMATION DEVICE

TECHNICAL FIELD

The present invention relates to an optical pickup device using a spherical aberration correction mechanism employing a lens drive device enabling a lens configuring the optical pickup device to be movable in an optical axis direction, an optical disc drive device using the optical pickup, and an optical information device.

BACKGROUND ART

Recently, development in compact and large-capacity optical disc devices is advancing to handle high definition still images and moving images and the like in the field of recording or reproducing information signals using an optical disc as an information recording medium.

The optical disc device is equipped with an optical pickup for forming a beam spot on an information recording surface of the optical disc. In the optical pickup, the light beam emitted from the light source is influenced by spherical aberration when passing through a transparent protective substrate layer which protects the information recording layer of the optical disc.

Japanese Unexamined Patent Publication No. 2004-77705 discloses a device in which a lens group for spherical aberration correction is arranged, a variable clearance is formed between surfaces of a pair of successive lens elements in the lens group, and a clearance interval is varied through a mechanical method to alleviate the influence of spherical aberration.

Figure 8A:
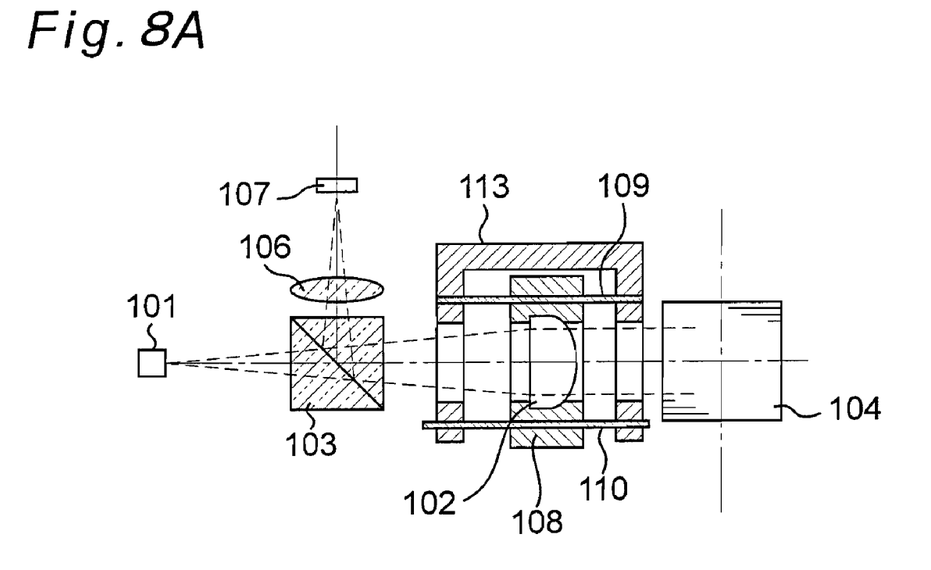
FIG. 8A is a schematic view showing a structure of a conventional optical pickup disclosed in patent document 1.
Figure 8B:
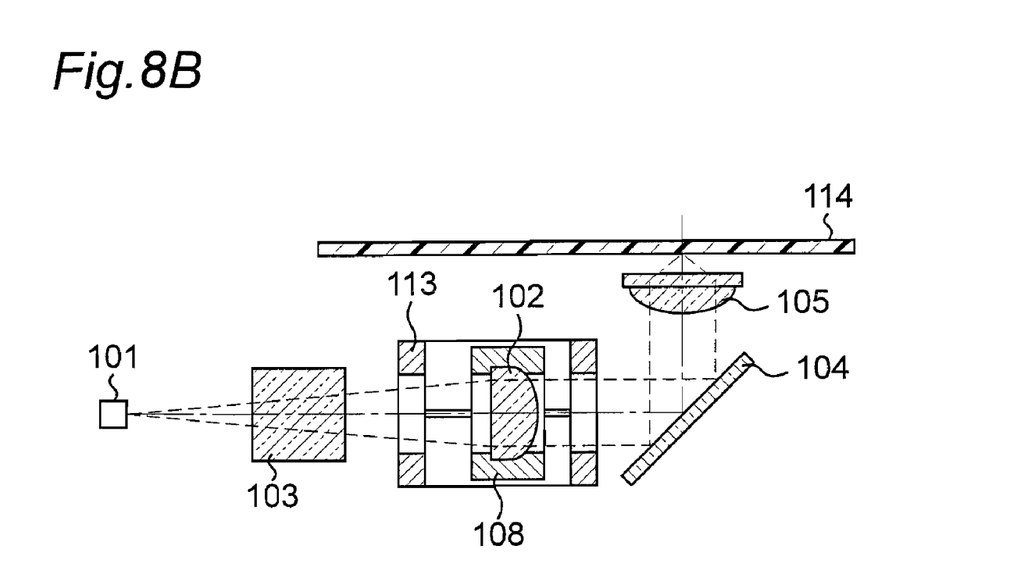
FIG. 8B is a schematic view showing the structure of the conventional optical pickup disclosed in patent document 1.

FIG. 8A and FIG. 8B are views showing in frame format a configuration of an example in which the conventional lens drive device of patent document 1 is applied to an optical pickup, where FIG. 8A is a plan view of the optical pickup, and FIG. 8B is a side view of the optical pickup.

In the figures, 114 denotes an optical disc, 101 denotes a laser diode serving as a light source, 102 denotes a collimator lens, 103 denotes a beam splitter, 104 denotes a rising mirror, 105 denotes an objective lens, 106 denotes a detection lens, and 107 denotes a photodetector including photoelectric conversion element etc.

When performing recordation/reproduction on the optical disc 114, the light beam emitted from the laser diode 101 is passed through the beam splitter 103 and the collimator lens 102, deflected towards the optical disc 114 by the rising mirror 104, and collected on a recording surface of the optical disc 114 as an optical spot by the objective lens 105. The light beam reflected at the surface of the optical disc 114 is passed through the objective lens 105, deflected by the rising mirror 104, passed through the collimator lens 102, deflected by the beam splitter 103, and collected on a light receiving surface of the photodetector 107 by the detection lens 106.

The collimator lens 102 is a lens for correcting diffusion and convergence of the light beam by moving the position in the optical axis direction. The collimator lens 102 is held by a lens holder 108, and the lens holder 108 is supported by a pair of shafts including a guide shaft 109 and a slidable shaft 110. The guide shaft 109 and the slidable shaft 110 are fixed to a shaft holding member 113. The guide shaft 109 and the slidable shaft 110 are arranged so that the extending direction of the respective shaft becomes parallel to the optical axis of the collimator lens 102.

The lens holder 108 is slidably engaged with the guide shaft 109 and the slidable shaft 110. That is, the collimator lens 102 can move in the optical axis direction when the lens holder 108 slidably moves along the guide shaft 109 and the slidable shaft 110. A drive mechanism (not shown) configured by a gear, a stepping motor, or the like is arranged as a mechanism for moving the lens holder 108. The lens holder 108 moves in the optical axis direction when the slidable shaft 110 slidably moves in a thrust direction in response to the drive power from the drive mechanism.

SUMMARY OF THE INVENTION

In recent years, however, development of a multi-layer optical information recording medium including a plurality of information recording layers is advancing to realize higher density of the optical information recording medium. In such a multi-layer optical information recording medium, there is a need to perform a greater spherical aberration correction compared to the optical information recording medium of one layer. The configuration of the optical system becomes more complicated to respond to recordation and reproduction of a plurality of types of optical information recording media, and the number of parts increases. The optical pickup itself is demanded to be miniaturized, and thus there is a need to configure the optical pickup so that spherical aberration correction can be performed in a narrow and small part arrangement space.

Further a multi-layer recording disc having various protective layer thicknesses is also being proposed as a next generation technique, and a spherical aberration correction mechanism of wider correction range is desired in the optical pickup.

It is an object of the present invention to provide an optical pickup more compact and of wider spherical aberration correction range than the optical pickup proposed in the prior art, an optical disc drive device using the optical pickup, and an optical information device.

The present invention is configured as below to achieve the above object.

According to the first aspect of the present invention, there is provided an optical pickup comprising:

an objective lens for collecting an exit light from a light source on an information recording surface of an information recording medium;

a spherical aberration correction lens, having one surface formed to a larger curvature than the other surface, for correcting a spherical aberration of a light beam collected on the information recording surface by the objective lens;

a rising mirror for deflecting the exit light passed through the spherical aberration correction lens at a substantially right angle and guiding the exit light to an entrance surface of the objective lens;

a lens holder, configured thinner than a maximum thickness width of the spherical aberration correction lens, for holding the spherical aberration correction lens so that the surface of large curvature partially projects out with the surface of large curvature facing the rising mirror side;

a guide member extending in an optical axis direction of the spherical aberration correction lens, and having an end arranged to the side of a reflecting surface of the rising mirror;

a slidable part fixed to the lens holder while being projected to the rising mirror side and slidably moved along the guide member; and a drive mechanism for driving the spherical aberration correction lens; wherein the spherical aberration correction lens and the rising mirror are configured to be approachable until the projecting portion from the lens holder of the spherical aberration correction lens overlaps the reflecting surface of the rising mirror by having the projecting portion of the slidable part fitted within the side surface of the reflecting surface of the rising mirror when the spherical aberration correction lens approaches the rising mirror the most.

In the above configuration, the spherical aberration correction lens may be a collimator lens for converting the exit light from the light source to a parallel light, or may be arranged in a beam expander for converting the beam diameter of when the exit light from the light source enters the objective lens.

The spherical aberration correction lens may include a color correction element.

Further, the spherical aberration correction lens may be configured to a shape flat in the height direction.

According to a second aspect of the present invention, an optical pickup of the first aspect where the guide member is configured by a pair of shaft bodies arranged parallel to each other, only one shaft to which the slidable part fixed to the lens holder while being projected towards the rising mirror side engages extending to the side of the rising mirror is provided.

According to a third aspect of the present invention, an optical pickup of the first aspect where the guide member is configured by a pair of shaft bodies arranged parallel to each other, a spring for biasing the lens holder towards the rising mirror side being further arranged on one shaft to which the slidable part fixed to the lens holder while being projected towards the rising mirror side engages is provided.

According to the present invention, the guide member is arranged extending to the side of the reflecting surface of the rising mirror, and the slidable part moving along the guide member is configured projecting out towards the rising mirror side further than the lens holder, and thus the spherical aberration correction lens can be moved very close to the rising mirror and a large movement range can be obtained. Therefore, a large correction range of the spherical aberration can be obtained. Since the spherical aberration correction lens is configured to project towards the rising mirror side with respect to the lens holder, the projecting portion of the spherical aberration correction lens can be arranged, in an overlapping state, on the reflecting surface of the rising mirror arranged in a tilted manner. Therefore, it can be suitably used in the information recording medium including two or more information recording layers requiring a large spherical aberration correction range.

Since the movement range of the spherical aberration lens can be made wider, the optical pickup can be configured small with respect to the absolute necessary movement range. Thus, further miniaturization from the conventional technique is achieved. The blur of the lens holder with respect to the guide member is prevented as the slidable part is formed projecting out with respect to the lens holder.

Since the spherical aberration correction lens and the slidable part are both projected out towards the rising mirror side with respect to the lens holder, the barycenter thereof approach each other, and thus moment by inertial force is less likely to be applied when driving the lens holder. Furthermore, since the spherical aberration correction lens is projected with respect to the lens holder when attaching the spherical aberration correction lens to the lens holder, the visibility is satisfactory, and forgetting of attachment of the lens is prevented. Moreover, since the lens having one side configured with large curvature is used, the attachment direction can be easily visually checked, and the front and back attachment direction of the lens can be easily checked.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

First Embodiment

Figure 1A:
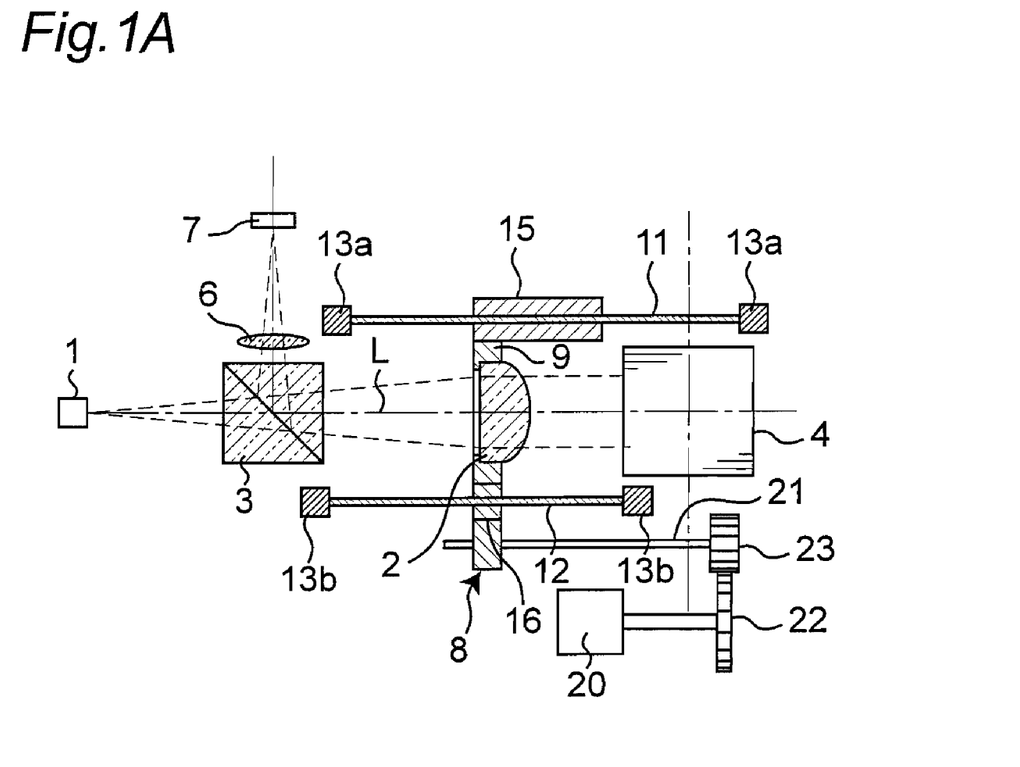
FIG. 1A is a plan view describing in frame format a configuration of an optical pickup of a first embodiment according to the present invention.
Figure 1B:
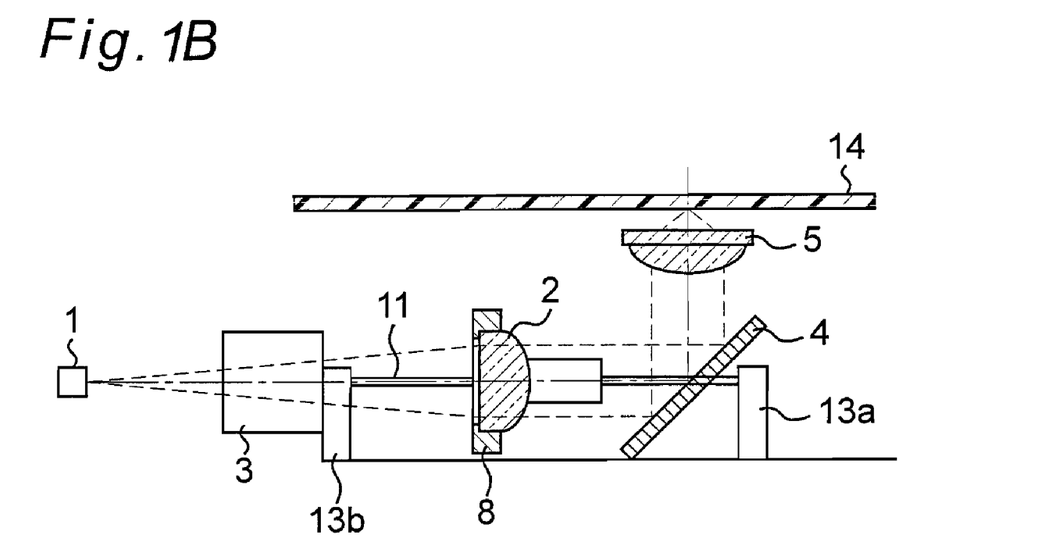
FIG. 1B is a side view describing in frame format the configuration of the optical pickup of the first embodiment according to the present invention.

FIGS. 1A and 1B are frame format views describing a configuration of an optical pickup according to a first embodiment of the present invention, where FIG. 1A is a plan view of the optical pickup and FIG. 1B is a side view of the optical pickup.

In the figures, 14 denotes an optical disc serving as an information recording medium, 1 denotes a laser diode serving as a light source, 2 denotes a collimator lens serving as a spherical aberration correction lens, 3 denotes a beam splitter, 4 denotes a rising mirror, 5 denotes an objective lens, 6 denotes a detection lens, and 7 denotes a photodetector including a photoelectric conversion element etc. 20 denotes a stepping motor and 21 denotes a ball screw. In the plan view of FIG. 1A, the illustration of the objective lens 5 and the optical disc 14 is omitted.

When performing recordation/reproduction with respect to the optical disc 14, the light beam emitted from the laser diode 1 is passed through the beam splitter 3 and the collimator lens 2 in order, deflected towards the optical disc 14 by the rising mirror 4, and collected on the optical disc 14 as an optical spot by the objective lens 5. The information is thereby recorded on the information recording surface of the optical disc 14, or the information recorded on the information recording surface of the optical disc 14 is read out.

Furthermore, the light beam reflected by the optical disc 14 is passed through the objective lens 5, deflected by the rising mirror 4, passed through the collimator lens 2, deflected by the beam splitter 3, and collected at the light receiving surface of the photodetector 7 by the detection lens 6, and the information from the information recording surface of the optical disc 14 is converted to an electrical signal.

The collimator lens 2 is a convex lens having one surface configured as a planar surface, and the other surface configured such that the central portion becomes convex.

A first guide shaft 11 and a second guide shaft 12 are arranged to be parallel to an optical axis L of the collimator lens 2. The guide shafts 11, 12 have both ends fixed to shaft holding parts 13a, 13b, respectively.

The shaft holding parts 13a of the first guide shaft 11 are arranged at a position on the downstream side in the optical axis direction of the beam splitter 3 and at a position on the side of the rising mirror 4. The first guide shaft 11 extends between the shaft holding parts 13a arranged at the relevant positions. The shaft holding parts 13b of the second guide shaft 12 are arranged at the end on the downstream side in the optical axis direction of the beam splitter 3 and at the end on the upstream side in the optical axis direction of the rising mirror 4. The second guide shaft 12 extends between the beam splitter 3 and the rising mirror 4.

In the optical pickup in the figures, the collimator lens 2 is moved along the first guide shaft 11 and the second guide shaft 12, so that the parallel light flux entering the objective lens 5 can be converged or diverged, whereby the spherical aberration at the spot position due to difference in the thickness of the protective layer of the optical disc 14 and the spherical aberration of the optical pickup is adjusted to be smaller than or equal to an acceptable value. That is, the collimator lens 2 converts the light beam transmitted through the collimator lens 2 to a parallel light when the distance from the light source 1 is equal to the focal length of the collimator lens 2. The collimator lens 2 has a function of diverging the light beam when the distance from the light source 1 becomes shorter than the focal length of the collimator lens 2, and converging the light beam when the distance from the light source 1 becomes longer than the focal length of the collimator lens 2.

A lens holder unit 8 is configured by a lens holder main body 9 for holding the collimator lens 2, and first and second slidable parts 15, 16 which engage the first and the second guide shafts 11, 12. The lens holder main body 9 is a frame shaped member for holding the collimator lens 2 so that the curved surface side of the collimator lens faces the rising mirror 4 side. The thickness dimension of the lens holder main body 9 is made to be smaller than the maximum thickness dimension of the collimator lens 2, so that the collimator lens 2 projects out further towards the rising mirror 4 side than the lens holder main body 9 when the lens holder main body 9 holds the collimator lens 2.

The surface on the beam splitter 3 side of the lens holder main body 9 is a planar surface.

The first and second slidable parts 15, 16 are slidably engaged along the first guide shaft 11 and the second guide shaft 12 serving as guide members.

The length of the slidable part serving as the receiving part of the guide shaft needs to be set large to suppress the tilt caused by the rattling of the collimator lens 2 in the optical axis direction. In the present embodiment, the dimension of the first slidable part 15 is configured thicker than the thickness dimension in the optical axis direction of the collimator lens 2. The first slidable part 15 is fixed to the lens holder main body 9 so as to project towards the downstream side in the optical axis direction with respect to the collimator lens 2. The rattling of the collimator lens 2 in the optical axis L direction becomes small by forming the first slidable part 15 to be long in the extending direction of the guide shaft 11.

The second slidable part 16 is configured with a thickness dimension of substantially the same extent as the lens holder main body 9. If the second slidable part 16 is formed long in the axial direction, the friction increases when the lens holder unit 8 moves, thereby influencing the movement of the lens holder unit.

The second slidable part 16 is screw-fitted to the ball screw 21 rotatable by the stepping motor 20 serving as a drive force generating source. When the stepping motor 20 is rotatably driven, the ball screw 21 is driven by way of gears 22, 23, and the relative position of the second slidable part 16 and the ball screw 21 changes, thereby moving the lens holder unit 8.

In addition to the stepping motor or the like, serving as the drive force generating source for driving the lens holder unit, a small and simple configuration can be obtained by using an ultrasonic motor as the drive force generating source.

Figure 2A:
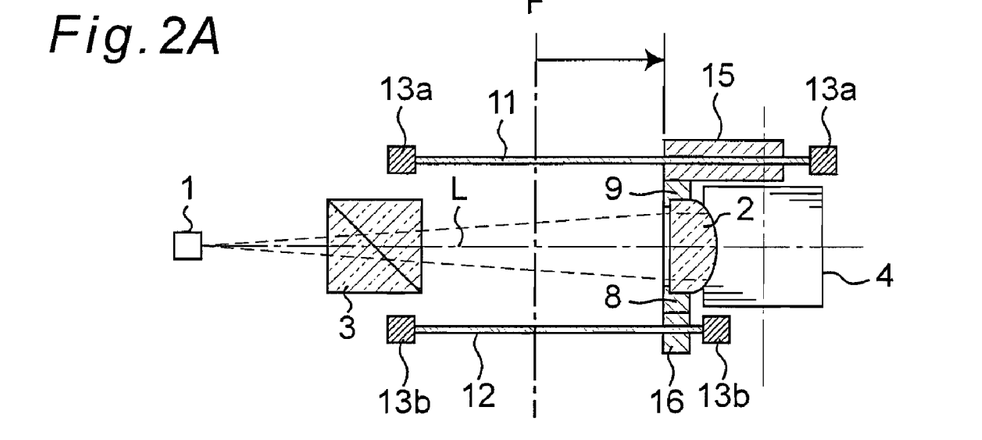
FIG. 2A, FIG. 2B, and FIG. 2C are plan views specifically describing a position relationship of a lens holder at different times of movement of a collimator lens.
Figure 2B:
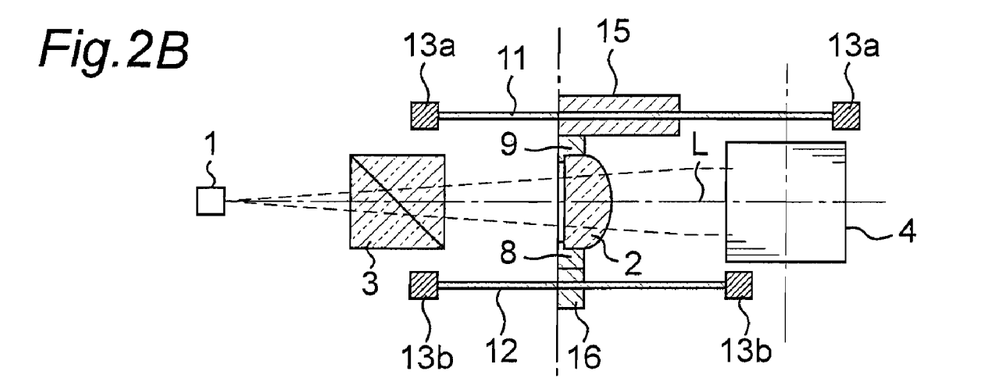
Figure 2C:
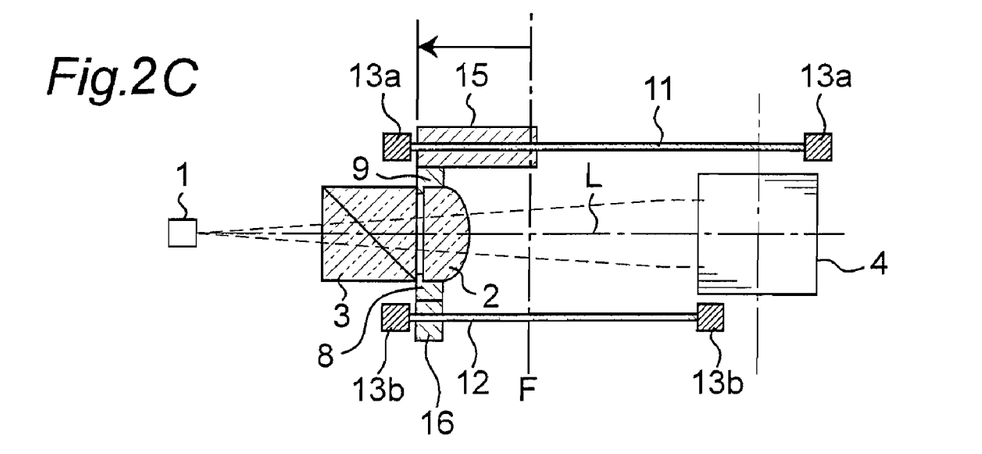

FIGS. 2A-2C are plan views specifically showing a positional relationship of the lens holder at different times of movement of the collimator lens. FIG. 2(b) shows a state in which the collimator lens 2 is at substantially the center, and FIGS. 2A and 2C show states in which the collimator lens 2 is moved to the rising mirror 4 side and the beam splitter 3 side, respectively.

The collimator lens functions to converge the light from the beam splitter 3 when approached to the rising mirror 4 side the most. In this state, the spherical aberration is corrected so that the focus is focused on the side close to the surface of the optical disc 14. Since one end of the first guide shaft 11 is extended to the side of the rising mirror 4, the first slidable part 15 fits within the side surface of the rising mirror 4 when the collimator lens 2 is approached to the rising mirror 4 side the most.

Since the collimator lens 2 has a configuration of projecting further towards the rising mirror 4 side than the lens holder 8, it is arranged so that the projecting portion of the collimator lens overlaps the reflecting surface of the rising mirror 4 in an overlapping manner when the lower end of the rising mirror 4 becomes very close to the collimator lens 2. That is, even if the lens holder is arranged so as to be very close to the rising mirror 4, the collimator lens 2 does not contact the surface of the rising mirror 4. Therefore, the collimator lens 2 can be moved to a position very close to the rising mirror 4.

In the optical pickup according to the present embodiment, the collimator lens 2 can be moved very close to the rising mirror 4, and the movable range of the collimator lens 2 can be increased by adopting the above configuration. In the optical pickup of the present embodiment, the movable range of the collimator lens 2 is large, and a greater spherical aberration correction can be made even with a small space.

As shown in FIG. 2C, the collimator functions to diverge the light from the beam splitter 3 when approached to the beam splitter 3 side the most. In this state, the spherical aberration is corrected so that the focus is focused on the far side in the thickness direction of the optical disc 14. As shown in FIG. 2(c), since the surface on the beam splitter 3 side of the lens holder unit 8 is formed to a substantially planar surface without projection, the lens holder unit can be moved very close to the collimator lens 3, and the movable range can be increased.

Thus, in the present embodiment, the movement amount of the collimator lens becomes large, and the spherical aberration correction amount with respect to the same size becomes large compared to when the present configuration is not adopted.

In the optical pickup of the present embodiment, the size in the height direction can be reduced by configuring the shape of the collimator lens to be flat in the height direction.

Figure 3A:
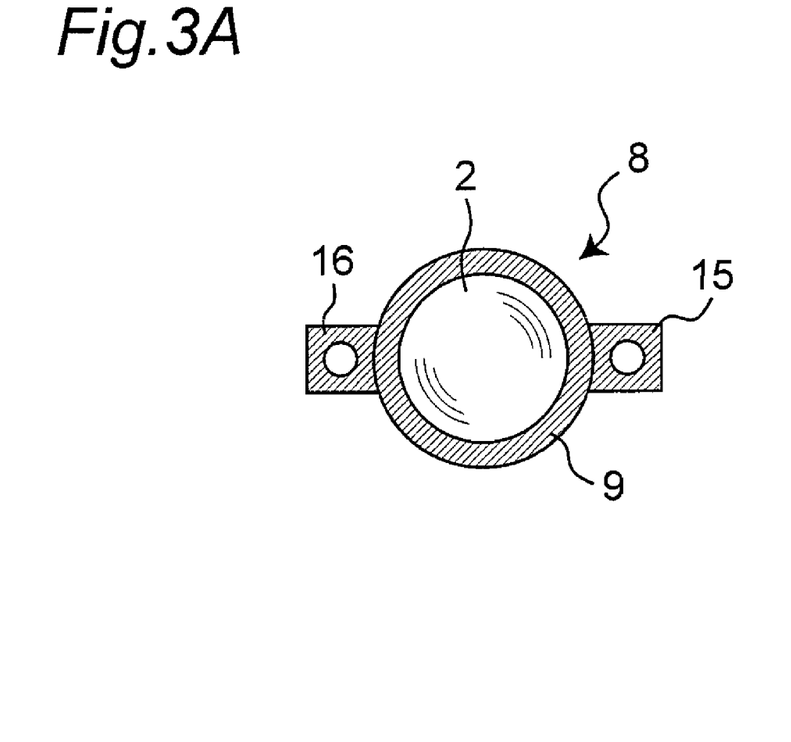
FIG. 3A is a view showing a state of the lens holder unit and the collimator lens used in the optical pickup of FIG. 1A when seen from an optical axis direction of the collimator lens.

FIG. 3A shows a state of the lens holder unit 8 and the collimator lens 2 seen from the optical axis direction of the collimator lens 2. In the example of FIG. 3A, the lens holder and the collimator lens are shown with the lens surface of the collimator lens 2 being circular.

In a case where the lateral direction in the figure corresponds to the tracking direction of the optical disc 14, the optically necessary effective diameter of the collimator lens may be small in the radial direction compared to the tracking direction. This is because the amount of movement (lens shift) in the tracking direction of the objective lens in time of tracking control does not need to be taken into consideration.

Figure 3B:
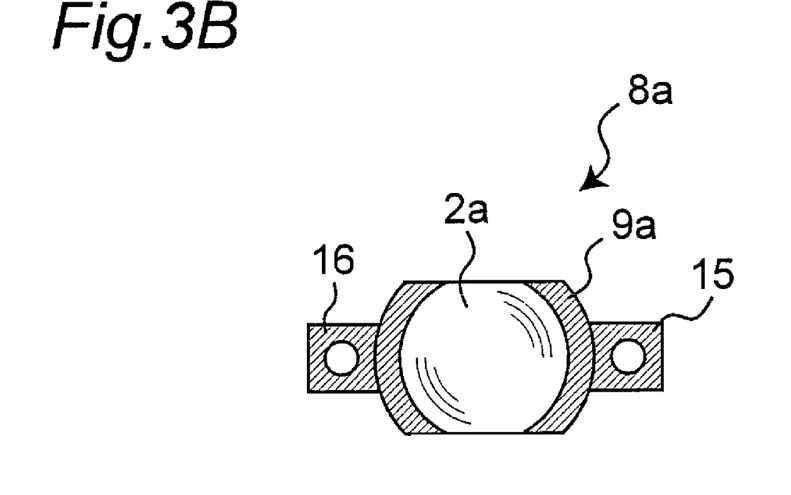
FIG. 3B is a view showing a state of the lens holder unit and the collimator lens according to a variant used in the optical pickup of FIG. 1A when seen from the optical axis direction of the collimator lens.

Therefore, in a collimator lens 2a and a lens holder main body 9a, one part in the height direction thereof is made to have a flat shape as if cut, as shown in FIG. 3B. The height of the entire lens holder unit 8a thus can be reduced, and a thin optical pickup can be configured.

The amount for reducing the collimator lens 2a and the lens holder main body 9a in the height direction is, for example, the length of the operation range of the lens shift in the radial direction of the objective lens. In creating the lens holder unit 8a of this configuration, an elliptical lens may be created in advance or upper and lower positions of the circular lens may be cut.

Figure 4A:
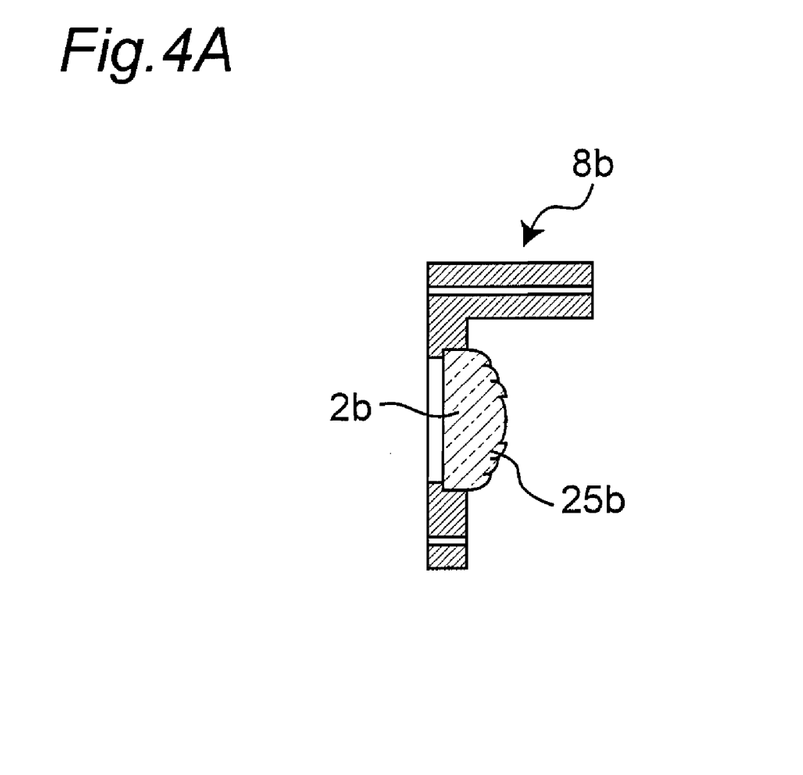
FIG. 4A is a view schematically showing a variant of a collimator lens applicable to the optical pickup of FIG. 1A.
Figure 4B:
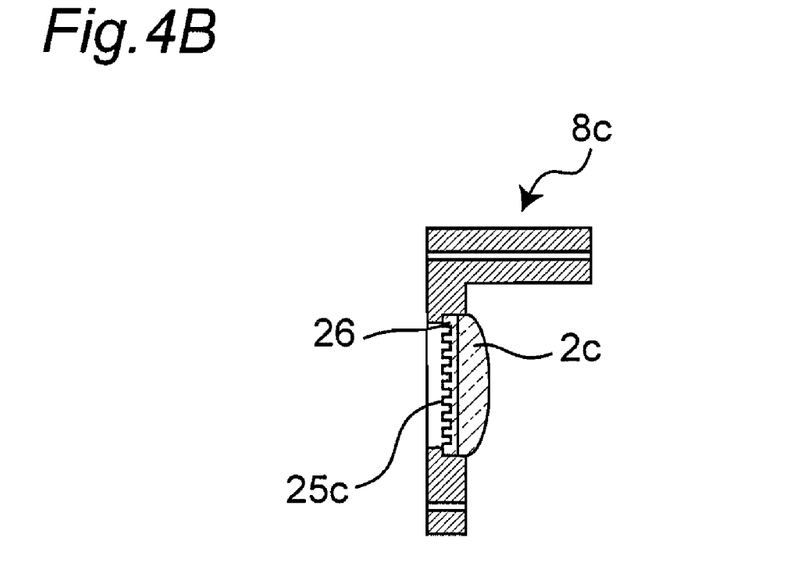
FIG. 4B is a view schematically showing a variant of a collimator lens applicable to the optical pickup of FIG. 1A.

FIG. 4A and FIG. 4B are views schematically showing a variant of a collimator lens applicable to the optical pickup according to the embodiment of the present invention. The collimator lenses 2b, 2c shown in FIG. 4A and FIG. 4B have features in that a diffraction optical element 25b, 25c for color aberration correction is formed on the entrance surface or the exit surface of the lens.

The collimator lens 2b shown in FIG. 4A has a configuration in which the diffraction optical lens 25b is integrally molded to the collimator lens 2b. The collimator lens 2c shown in FIG. 4B is a lens in which the diffraction optical element 25c is attached to the surface (surface on the left side in the figure) of smaller curvature, and has a configuration in which the color aberration element 26 is integrally arranged. The diffraction optical element may be arranged on both the entrance side and the exit side of the collimator lens.

The light collecting property of the objective lens can be satisfactorily ensured even when wavelength fluctuation exists in the light source or the wavelength of the light source is spread by attaching the diffraction optical element to the collimator lens.

Figure 5:
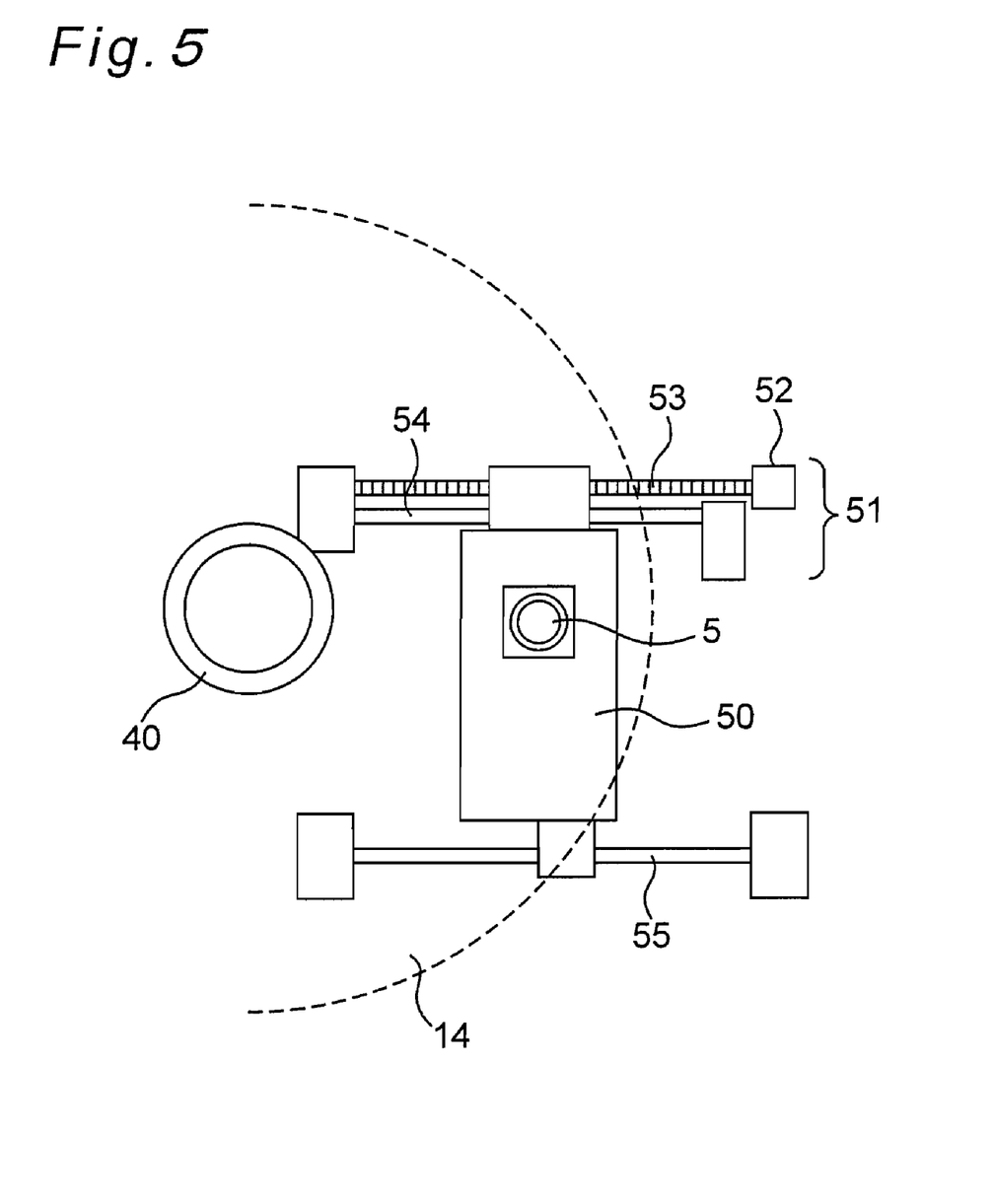
FIG. 5 is a view showing a configuration of an optical disc drive mounted with the optical pickup of FIG. 1A.

FIG. 5 is a view showing a configuration of an optical disc drive describing an application example of the optical pickup shown in FIG. 1A, where 50 denotes the optical pickup unit of the configuration shown in FIG. 1. The optical pickup unit 50 is configured to be movable in the radial direction of the disc 14 by a pickup movement drive mechanism 51.

The pickup movement drive mechanism 51 includes a seek motor 52 serving as a power source, and a lead screw 53. The pickup unit 50 is supported by guide rails 54, 55 extending in the radial direction of the disc, and moves along the guide rails 54, 55 when the lead screw 53 is rotatably driven by the movement of the seek motor 52.

A spindle motor 40 is a motor for rotatably driving the optical disc 14. The reading and recording of information with respect to the optical disc 14 are performed by moving the optical pickup 50 in the seek direction while rotatably driving the optical disc 14 with the spindle motor 40.

Since the optical pickup according to the present embodiment can be configured small, a compact and high performance optical information device can be obtained by applying the optical disc drive mounted with the optical pickup to the optical information device.

Second Embodiment

Figure 6:
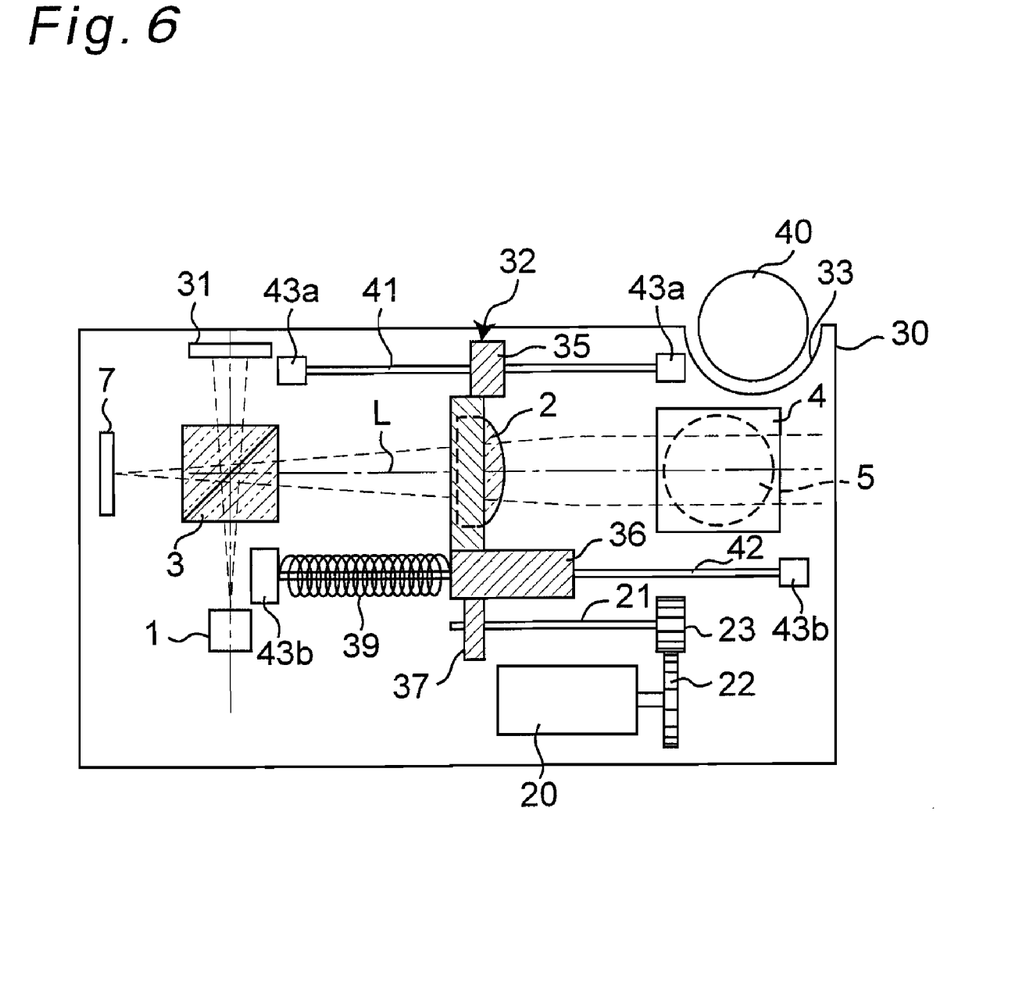
FIG. 6 is a plan view describing in frame format a configuration of an optical pickup of a second embodiment according to the present invention.

FIG. 6 is a frame format view describing a configuration of an optical pickup according to a second embodiment of the present invention.

In FIG. 6, the laser diode 1 serving as a light source, the collimator lens 2 serving as a spherical aberration correction lens, the beam splitter 3, the rising mirror 4, the objective lens 5, the photodetector 7 including the photoelectric conversion element, the stepping motor 20, and the ball screw 21 have the same configuration as the first embodiment, and thus the description will be omitted. 31 is a light quantity monitor for detecting the light quantity of the laser diode 1 by detecting the light quantity of the light reflected from the optical disc 14.

In the present embodiment, the proximate position of the objective lens of a housing 30 for accommodating each member configuring the optical pickup is formed with a cutout 33 so that a spindle motor 40 and the housing 30 do not interfere. If the optical pickup becomes closest to the spindle motor 40, the spindle motor 40 fits into the cutout 33, so that the objective lens of the optical pickup can be arranged at the vicinity of the spindle motor. Therefore, reading and writing of information at the position close to the center of the optical disc 14 can be performed.

When performing recordation/reproduction with respect to the optical disc, the light beam emitted from the laser diode 1 is reflected and deflected by the beam splitter 3, passed through the collimator lens 2, deflected towards the optical disc 14 by the rising mirror 4, and collected on the optical disc 14 as an optical spot by the objective lens (not shown). The information is thereby recorded on the information recording surface of the optical disc 14, or the information recorded on the information recording surface of the optical disc 14 is read out.

Furthermore, the light beam reflected by the optical disc 14 is passed through the objective lens, deflected by the rising mirror 4, passed through the collimator lens 2, transmitted through the beam splitter 3, and collected at the light receiving surface of the photodetector 7, and the information from the information recording surface of the optical disc 14 is converted to an electrical signal.

A first guide shaft 41 and a second guide shaft 42 are arranged to be parallel to the optical axis L of the collimator lens 2. The guide shafts 41, 42 have both ends fixed to shaft holding parts 43a, 43b, respectively.

The shaft holding parts 43a of the first guide shaft 41 are arranged at the end on the downstream side in the optical direction of the beam splitter 3 and at the end on the upstream side in the optical axis direction of the rising mirror 4. The first guide shaft 41 is arranged at a position close to the spindle motor 40 with respect to the collimator lens 2, and thus is not arranged at the side of the rising mirror due to the cutout 33 in the optical pickup including the cutout 33. The shaft holding part 43b of the second guide shaft 42 is arranged at the end on the downstream side in the optical axis direction of the beam splitter 3 and at the position on the side of the rising mirror 4.

In the optical pickup in the figure, the collimator lens 2 is moved along the first guide shaft 11 and the second guide shaft 12, so that the parallel light flux entering the objective lens 5 can be converged or diverged, whereby the spherical aberration at the spot position due to difference in the thickness of the protective layer of the optical disc 14 and the spherical aberration of the optical pickup is adjusted to be smaller than or equal to an acceptable value.

A lens holder unit 32 is configured by the lens holder main body 9 for holding the collimator lens 2, and first and second slidable parts 35, 36 which engage the first and the second guide shafts 41, 42. The lens holder main body 9 holds the collimator lens 2 so that the curved surface side of the collimator lens faces the rising mirror 4 side. The collimator lens 2 projects out towards the rising mirror 4 side further than the lens holder 8 when the lens holder main body 9 holds the collimator lens 2.

The surface on the beam splitter 3 side of the lens holder main body 9 is a planar surface.

The first and second slidable parts 35, 36 are slidably engaged along the first guide shaft 41 and the second guide shaft 42 serving as guide members.

The dimension of the second slidable part 36 is configured thicker than the thickness dimension in the optical axis direction of the collimator lens 2 to suppress the tilt caused by the rattling of the collimator lens 2 in the optical axis direction. The second slidable part 36 is fixed to the lens holder main body 9 so as to project towards the downstream side in the optical axis direction with respect to the collimator lens 2. The rattling of the collimator lens 2 in the optical axis L direction becomes small by forming the second slidable part 36 to be long in the extending direction of the guide shaft 42.

A spring 39 is arranged on the second guide shaft 42 to bias the lens holder unit 32 towards the rising lens 4. The play in the optical axis L direction of the lens holder unit 32 is eliminated, and rattling in the optical axis direction can be prevented by arranging the spring 39.

The second slidable part 36 includes a coupling part 37 screw fitted to the ball spring 21 rotatable by the stepping motor 20 serving as the drive force generating source. When the stepping motor 20 is rotatably driven, the ball screw 21 is driven by way of gears 22, 23, and the relative position of the second slidable part 36 and the ball screw 21 changes, thereby moving the lens holder unit 8.

In the optical pickup of the present embodiment as well, the second slidable part 36 is configured to fit within the side surface of the rising mirror 4, and is arranged so that the projecting portion of the collimator lens overlaps the reflecting surface of the rising mirror 4 in an overlapping manner when the collimator lens is approached to the rising mirror 4 side the most. Therefore, the collimator lens 2 can be moved to a position very close to the rising mirror 4, and the movable range of the collimator lens 2 can be increased.

Since the surface on the beam splitter 3 side of the lens holder unit 8 is formed to a substantially planar surface without projections, the lens holder unit can be moved very close to the collimator lens 3, and the movable range can be increased.

In the optical pickup of the present embodiment as well, the size in the height direction can be reduced by configuring the shape of the collimator lens to be flat in the height direction as shown in FIG. 3B. The collimator lenses 2b, 2c having the diffraction optical elements 25b, 25c for color aberration correction formed on the entrance surface or the exit surface of the lens shown in FIG. 4A and FIG. 4B may be used.

Third Embodiment

Figure 7A:
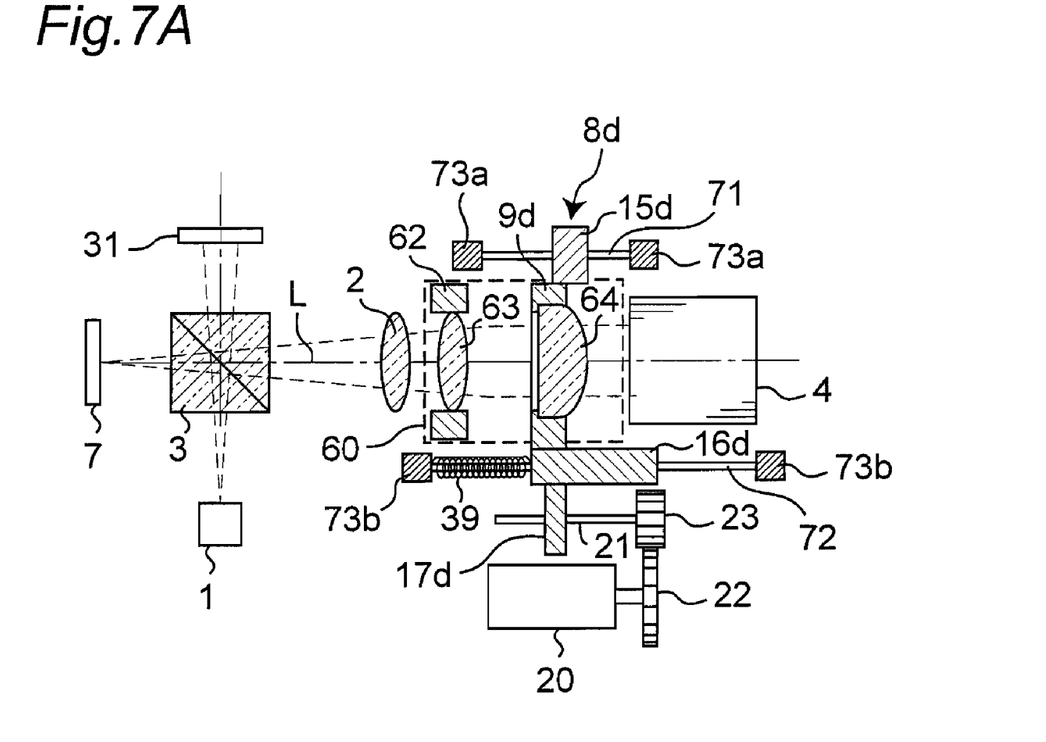
FIG. 7A is a plan view describing in frame format a configuration of an optical pickup of a third embodiment according to the present invention.
Figure 7B:
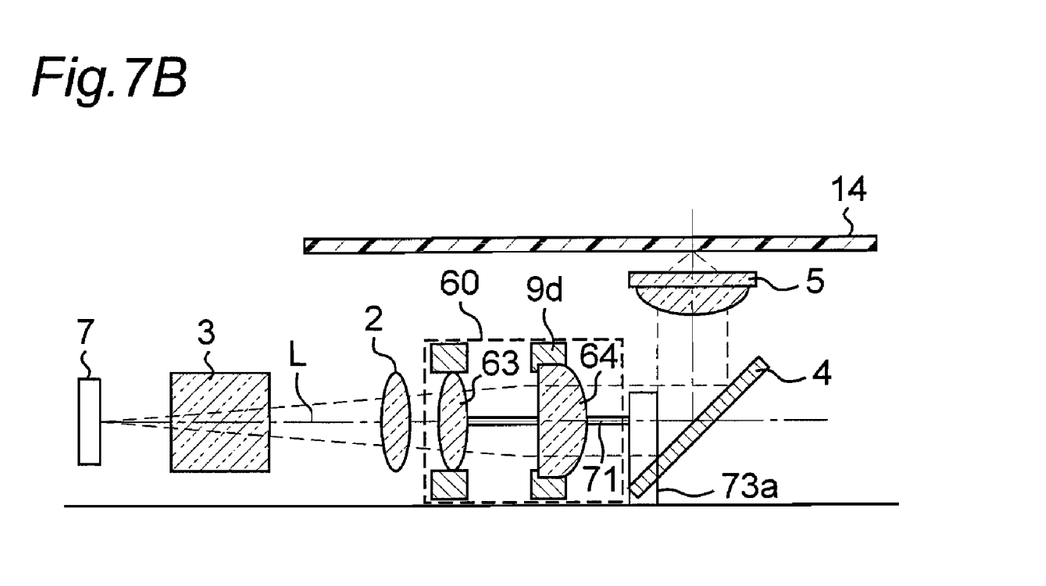
FIG. 7B is a side view describing in frame format the configuration of the optical pickup of the third embodiment according to the present invention.

FIG. 7A and FIG. 7B are frame format views describing a configuration of an optical pickup according to a third embodiment of the present invention, where FIG. 7A is a plan view of the optical pickup, and FIG. 7B is a side view of the optical pickup.

In FIG. 7A and FIG. 7B, the laser diode 1 serving as a light source, the beam splitter 3, the rising mirror 4, the objective lens 5, the photodetector 7 including the photoelectric conversion element, the stepping motor 20, and the ball screw 21 have the same configuration as the first embodiment, and thus the description will be omitted. 31 is a light quantity monitor for detecting the light quantity of the laser diode 1 by detecting the light quantity of the light reflected from the optical disc 14.

In the present embodiment, the collimator lens 2 for converting the laser light to a parallel light is fixed. A beam expander unit 60 for changing the beam system of the light beam from the light source is arranged between the collimator lens 2 and the rising mirror. The beam expander unit 60 functions as a spherical aberration correction lens.

The beam expander unit 60 includes two lenses, a first lens positioned on the beam splitter 3 side and a second lens positioned on the rising mirror 4 side. The first lens 63 is fixed, and the second lens 64 is movable in the optical axis L direction.

When performing recordation/reproduction with respect to the optical disc, the light beam emitted from the laser diode 1 is reflected and deflected by the beam splitter 3, passed through the collimator lens 2 and the beam expander unit 60, deflected towards the optical disc 14 by the rising mirror 4, and collected on the optical disc 14 as an optical spot by the objective lens (not shown). The information is thereby recorded on the information recording surface of the optical disc 14, or the information recorded on the information recording surface of the optical disc 14 is read out.

Furthermore, the light beam reflected by the optical disc 14 is passed through the objective lens, deflected by the rising mirror 4, passed through the beam expander unit 60 and the collimator lens 2, transmitted through the beam splitter 3, and collected at the light receiving surface of the photodetector 7, and the information from the information recording surface of the optical disc 14 is converted to an electrical signal.

The first lens 63 of the beam expander unit 60 is a convex lens configured such that both surfaces are curved surfaces, and the second lens 64 is a convex lens having one surface configured as a planar surface and the other surface configured such that the central portion becomes convex.

The first lens 63 is held and fixed by a first lens holder 62. The first lens holder 62 has the thickness dimension wider than or the same as the first lens 63, and the first lens 62 is configured so as not to project out than the first lens holder.

The second lens 64 is fixed to a second lens holder main body 9d serving as a configuration member of the lens holder unit 8*d*, and the configuration of the lens holder unit 8*d* will be hereinafter described in detail.

A first guide shaft 71 and a second guide shaft 72 are arranged to be parallel to the optical axis L of the collimator lens 2. The guide shafts 71, 72 have both ends fixed to shaft holding parts 73*a*, 73*b*, respectively.

The shaft holding parts 73*a* of the first guide shaft 71 are arranged at a position on the downstream side in the optical axis direction of the first lens 63 and at the end on the upstream side in the optical axis direction of the rising mirror 4. The shaft holding part 73*b* of the second guide shaft 72 is arranged at the end on the upstream side in the optical axis direction of the first lens 63 and at the position on the side of the rising mirror 4. The shaft holding parts 73*b* of the second guide shaft 72 are extended to the end on the upstream side in the optical axis direction of the first lens 63 and is positioned on the upstream side than the end of the first guide shaft to ensure a space for accommodating the spring 39 when the lens holder unit 9*d* becomes closest to the first lens 63, as hereinafter described.

In the optical pickup in the figure, the second lens 64 is moved along the first guide shaft 11 and the second guide shaft 12 to change the distance of the first and second lenses and converge or diverge the light flux, so that the spherical aberration can be adjusted.

The lens holder unit 8*d* is configured by the lens holder main body 9*d* for holding the second lens 64, first and second slidable parts 15*d*, 16*d* which engage the first and the second guide shafts 71, 72, and a coupling part 17*d* coupled to the second slidable part. The lens holder main body 9*d* is a frame shaped member for holding the second lens 64 so that the curved surface side of the second lens 64 faces the rising mirror 4 side. The thickness dimension of the second lens holder main body 9*d* is made to be smaller than the maximum thickness dimension of the second lens 64, so that the second lens 64 projects out towards the rising mirror 4 side than the lens holder main body 9*d* when the lens holder main body 9*d* holds the second lens 64.

The surface on the first lens 63 side of the lens holder main body 9*d* is a planar surface.

In the present embodiment, the dimension of the second slidable part 16*d* needs to be thicker than the thickness dimension in the optical axis direction of the second lens 64 to suppress the tilt caused by the rattling of the second lens 64 in the optical axis direction. The second slidable part 16*d* is fixed to the lens holder main body 9*d* so as to project towards the downstream side in the optical axis direction with respect to the second lens 64. The rattling of the collimator lens 2 in the optical axis L direction becomes small by forming the second slidable part 16*d* to be long in the extending direction of the guide shaft 72.

The spring 39 is arranged on the second guide shaft 72 to bias the lens holder unit 9*d* towards the rising mirror 4. The play in the optical axis L direction of the lens holder unit 8*d* is eliminated, and rattling in the optical axis direction can be prevented by arranging the spring 39.

The second slidable part 16*d* is coupled to the coupling part 17*d* screw fitted to the ball spring 21 rotatable by the stepping motor 20 serving as the drive force generating source. When the stepping motor 20 is rotatably driven, the ball screw 21 is driven by way of gears 22, 23, and the relative position of the second slidable part 16*d* and the ball screw 21 changes, thereby moving the lens holder unit 8.

In the optical pickup of the present embodiment as well, the second slidable part 16*d* is configured to fit within the side surface of the rising mirror 4, and is arranged so that the projecting portion of the collimator lens overlaps the reflecting surface of the rising mirror 4 in an overlapping manner when the second lens 64 is approached to the rising mirror 4 side the most. Therefore, the second lens 64 can be moved to a position very close to the rising mirror 4, and the movable range of the second lens 64 can be increased.

Since the surface on the first lens 63 side of the lens holder unit 8*d* is formed to a substantially planar surface without projections, and the first lens 63 does not project out from the first lens holder 62, the lens holder unit 8*d* can be moved very close to the first lens holder 62, and the movable range of the lens holder unit 8*d* can be increased.

In the present embodiment as well, the size in the height direction can be reduced by configuring the shape of the lens configuring the beam expander unit 60 to be flat in the height direction as shown in FIG. 3B. The collimator lenses having the diffraction optical element for color aberration correction formed on the entrance surface or the exit surface of the lens shown in FIG. 4A and FIG. 4B may be used.

The optical pickup of the present example may be applied to a dual layer disc or a future multi-layer disc of three or more layers, so that an optical pickup can be configured small.

The present invention is not limited to the above embodiments, and various other modes can be implemented. The guide part is arranged on the lens holder side so as to slidably move on the guide shaft in the present example, but the guide shaft may be joined on the lens holder side so that the guide shaft slidably moves through a guide groove.

Arbitrary embodiments of the various embodiments described above may be appropriately combined to obtain the respective effects.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The optical pickup, optical disc drive device and the optical information device of the present invention are useful for the magnetic optical recording device and the optical information recording and reproducing device using optical discs such as CD, DVD, HD-DVD, Blu-ray disc device, and the like. The present invention can also be applied for an optical system or a device of the hologram recording device or the future ultra-high density recording and reproducing device.

The invention claimed is:

1. An optical pickup comprising:
   an objective lens for collecting an exit light from a light source on an information recording surface of an information recording medium;
   a spherical aberration correction lens, having one surface formed to a larger curvature than the other surface, for correcting a spherical aberration of a light beam collected on the information recording surface by the objective lens;
   a rising mirror for deflecting the exit light passed through the spherical aberration correction lens at a substantially right angle and guiding the exit light to an entrance surface of the objective lens;
   a lens holder, configured thinner than a maximum thickness width of the spherical aberration correction lens, for holding the spherical aberration correction lens so that the surface of large curvature partially projects out with the surface of large curvature facing the rising mirror side;

a guide member extending in an optical axis direction of the spherical aberration correction lens, and having an end arranged to the side of a reflecting surface of the rising mirror;

a slidable part fixed to the lens holder while being projected to the rising mirror side and slidably moved along the guide member; and a drive mechanism for driving the spherical aberration correction lens; wherein the spherical aberration correction lens and the rising mirror are configured to be approachable until the projecting portion from the lens holder of the spherical aberration correction lens overlaps the reflecting surface of the rising mirror by having the projecting portion of the slidable part fitted within the side surface of the reflecting surface of the rising mirror when the spherical aberration correction lens approaches the rising mirror the most.

2. The optical pickup according to claim 1, wherein the spherical aberration correction lens is a collimator lens for converting the exit light from the light source to a parallel light.

3. The optical pickup according to claim 1, wherein the spherical aberration correction lens is arranged in a beam expander for converting a beam diameter of when the exit light from the light source enters the objective lens.

4. The optical pickup according to claim 2, wherein the spherical aberration correction lens includes a color correction element.

5. The optical pickup according to claim 2, wherein the spherical aberration correction lens is configured to a shape flat in a height direction.

6. The optical pickup according to claim 1, wherein the guide member is configured by a pair of shafts arranged parallel to each other said pair of shafts including, only one shaft to which the slidable part fixed to the lens holder while being projected towards the rising mirror side engages extending to the side of the rising mirror.

7. The optical pickup according to claim 1, wherein the guide member is configured by a pair of shafts arranged parallel to each other, a spring for biasing the lens holder towards the rising mirror side being further arranged on one of the shafts, and said one of the shafts engages with the slidable part fixed to the lens holder while being projected towards the rising mirror side.

8. The optical pickup according to claim 1, wherein the drive mechanism is a stepping motor.

9. The optical pickup according to claim 1, wherein the drive mechanism is an ultrasonic motor.

10. The optical pickup according to claim 1, wherein the information recording medium includes two or more layers of information recording layer.

11. An optical disc drive device comprising the optical pickup according to claim 1.

12. An optical information device comprising the optical disc drive of claim 11.

* * * * *